United States Patent [19]

Scott

[11] 4,231,765
[45] Nov. 4, 1980

[54] AIR CLEANING APPARATUS AND METHOD

[76] Inventor: Morton J. Scott, 6472 Riverdale, Hamburg, Mich. 48139

[21] Appl. No.: 30,719

[22] Filed: Apr. 17, 1979

[51] Int. Cl.³ .................. B01D 47/12; F24C 15/20; F23J 15/00

[52] U.S. Cl. .......................... 55/90; 55/94; 55/233; 55/240; 55/260; 55/432; 55/DIG. 36; 261/112; 261/126; 261/DIG. 9; 110/215; 126/299 E; 134/18; 134/22 R; 134/29

[58] Field of Search ............ 55/89, 90, 93, 94, 96, 55/223, 233, 234, 240, 241, 242, 260, DIG. 36, 432; 261/112, 126, DIG. 9; 110/215; 126/299 E; 134/18, 22 R, 29

[56] References Cited

U.S. PATENT DOCUMENTS

| | | | |
|---|---|---|---|
| 906,940 | 12/1908 | Schmitt et al. | 55/233 |
| 2,210,429 | 8/1940 | Pietzsch | 55/233 |
| 2,380,826 | 7/1945 | Dorfan | 261/126 |
| 2,387,345 | 10/1945 | Pearl | 55/260 |
| 3,487,607 | 1/1970 | Cox | 55/260 |
| 3,494,108 | 2/1970 | Moragne | 55/242 |
| 3,653,186 | 4/1972 | McLendon | 55/223 |
| 3,708,958 | 1/1973 | Duty et al. | 55/90 |
| 3,766,716 | 10/1973 | Rolz | 55/223 |
| 3,785,124 | 1/1974 | Gaylord | 55/242 |
| 3,827,343 | 8/1974 | Darm | 55/242 |

FOREIGN PATENT DOCUMENTS

| | | | |
|---|---|---|---|
| 559513 | 3/1957 | Italy | 55/260 |
| 713352 | 9/1966 | Italy | 55/223 |
| 47-35497 | 6/1972 | Japan | 261/DIG. 9 |

Primary Examiner—David L. Lacey
Attorney, Agent, or Firm—Harness, Dickey & Pierce

[57] ABSTRACT

Disclosed is an air cleaning apparatus having a rectangular enclosure with air inlet and outlet passages and internal lower and upper baffles which sequentially direct inlet air through lower and upper water curtains which are provided by a recirculating water system. The apparatus also has a separate scrubbing water system to wash the internal surfaces of the apparatus. In operation, the scrubbing system is periodically activated and the reservoir of the recirculating water system is periodically drained and refilled with fresh water. Also disclosed is the method of using the apparatus.

10 Claims, 5 Drawing Figures

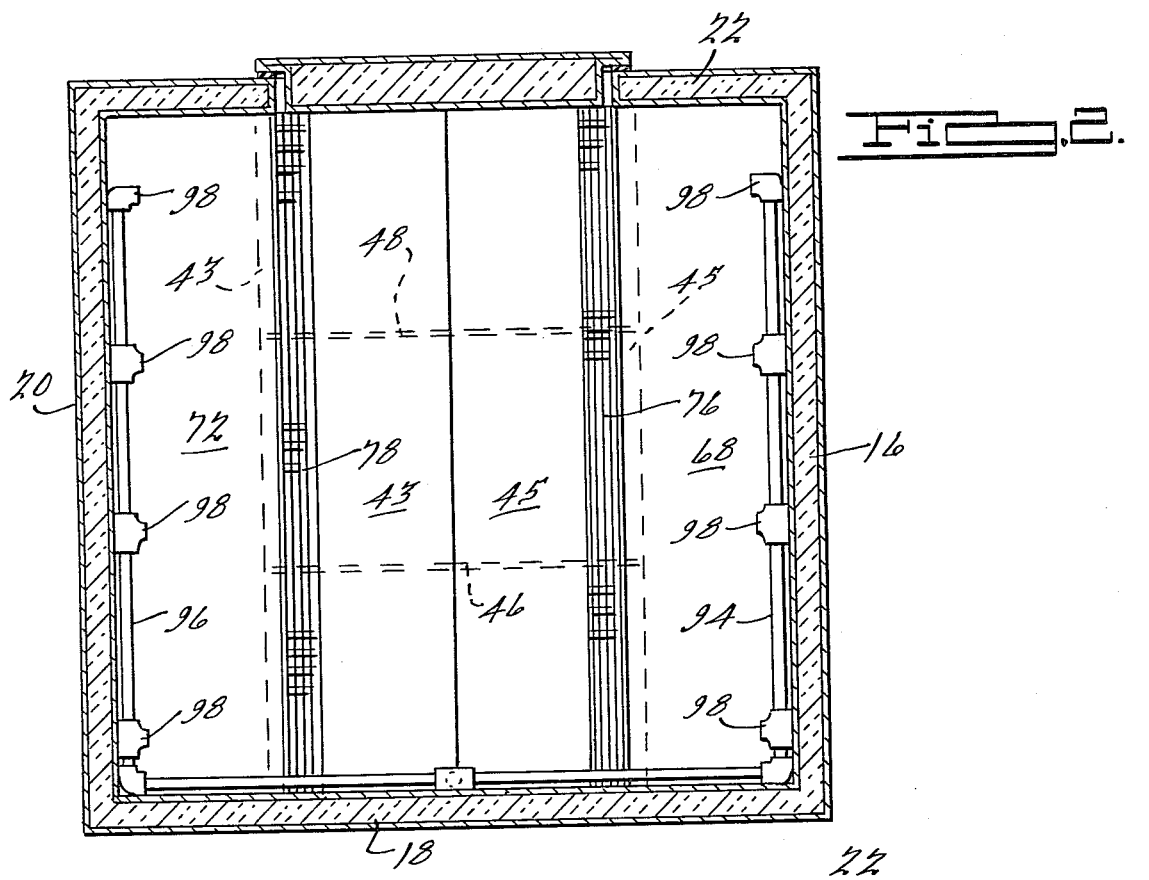
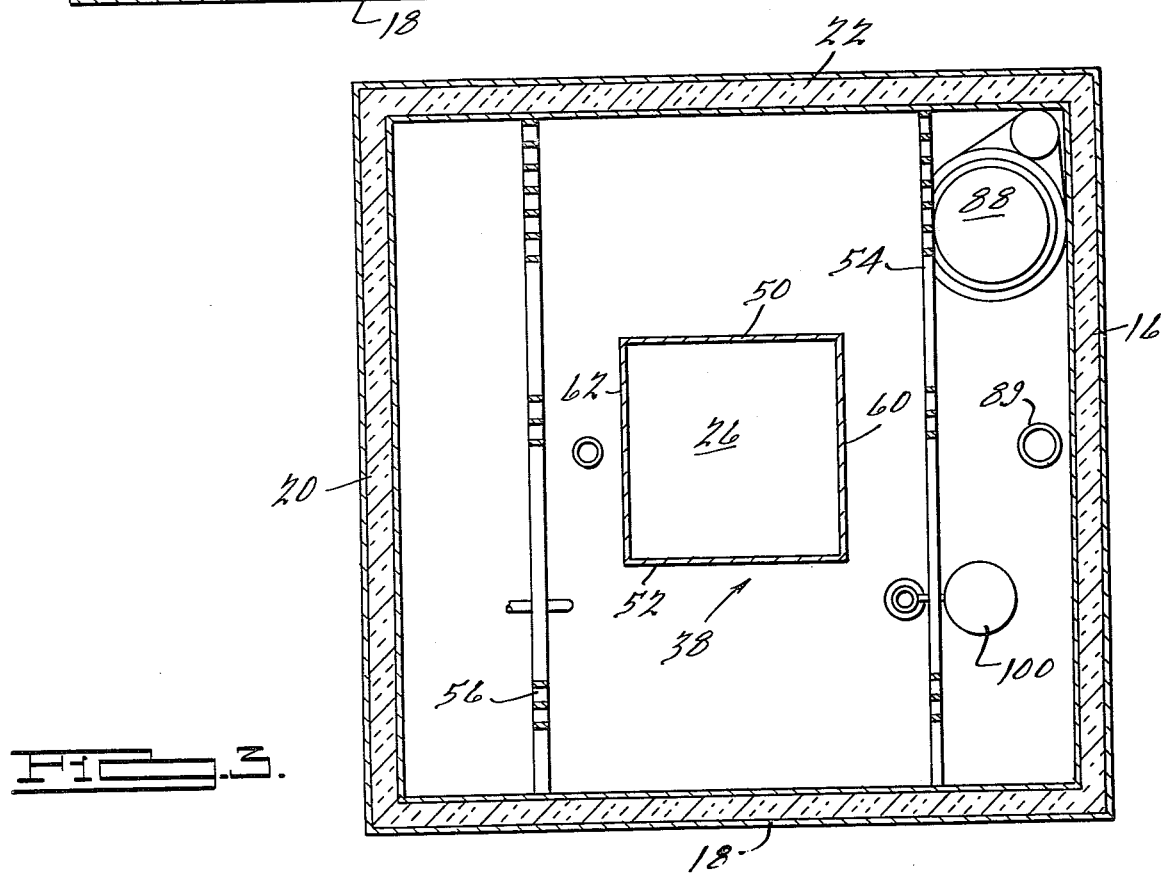

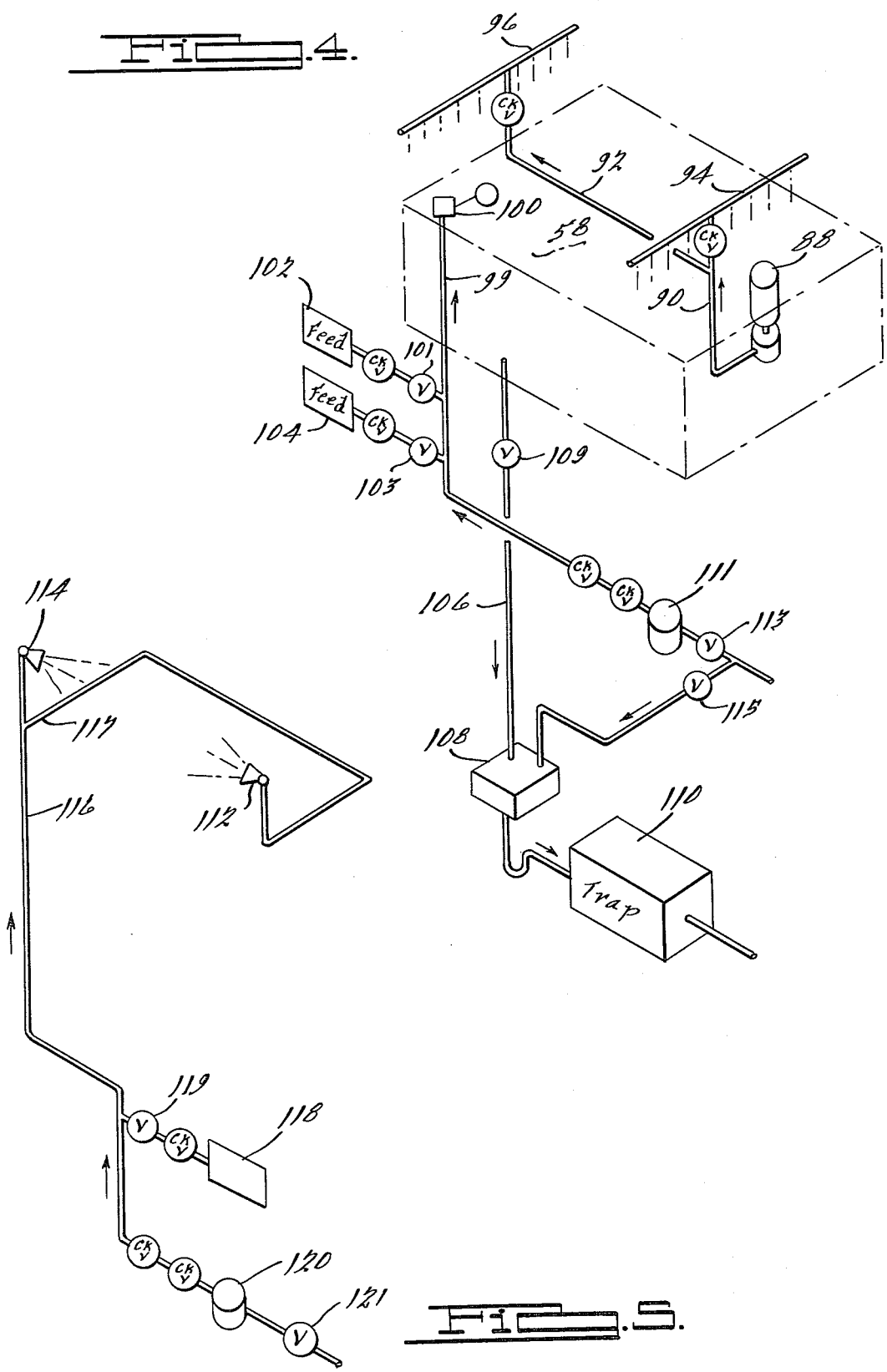

AIR CLEANING APPARATUS AND METHOD

BACKGROUND OF THE INVENTION

The present invention relates to an apparatus and method for ventilating and purifying air such as grease or smoke laden air associated with cooking stoves in restaurant or other commercial kitchens. More specifically, the present invention relates to a ventilating apparatus and method wherein air containing grease, precious metals, ash, smoke or other combustion gases or vapors and/or heat is forced through a plurality of continuous chemically treated water curtains which remove the contaminants and/or heat from the air, the contaminants being subsequently removed from the system by an internal water washing system supplied independently of the water curtains.

Ventilation of smoke, grease, vapor and/or heat such as that generated by frying foods in a restaurant, commercial kitchen, or industry requires a ventilating apparatus for filtering or otherwise removing the contaminants and excessive heat from the air before exhausting the air into the atmosphere so as to avoid particulate, gaseous, or thermal pollution of the atmosphere. Generally speaking, the ventilation of such air is carried out for several hours of each day, further requiring an apparatus for removing contaminants which is economical to operate.

Wherefore, it is an object of the present invention to provide an economical and practical apparatus and method for ventilating a body of air while simultaneously removing grease, smoke, vapors or other contaminants or heat therefrom. Another object of the present invention is to provide an apparatus and method for efficiently cleansing air to remove pollutants therefrom by employing water curtains of recycled water. Yet another object of this invention is to provide an apparatus with internal baffles which sequentially direct inlet air through a plurality of transverse, solid, i.e. continuous water curtains. Still another object of this invention is to provide an air cleaning apparatus wherein a particular portion of water is used to sequentially provide first an upper water curtain and then a lower water curtain, and wherein the inlet air is sequentially passed first through the lower water curtain and then through the upper water curtain, whereby the initial cleansing of inlet air is carried out by a water portion which has just previously carried out the final cleansing of inlet air so as to maximize the cleaning effect of the pair of water curtains. A further object of this invention is to provide an apparatus having effective and efficient means for removing pollutants or other precipitated particulate matter from the interior of the apparatus. These and other objects, features and advantages of the present invention will be apparent from the disclosure herein and the following claims, taken in conjunction with the accompanying drawings.

BRIEF DESCRIPTION OF THE DRAWINGS

FIG. 2 is a sectional view taken along line 2—2 of FIG. 1;

FIG. 3 is a sectional view taken along line 3—3 of FIG. 1;

FIG. 4 is a somewhat diagrammatical view of the water curtain piping and cleaning drain piping of the present invention; and FIG. 5 is a somewhat diagrammatical view of the cleaning inlet piping of the present invention.

DESCRIPTION OF THE INVENTION

Figure 1:
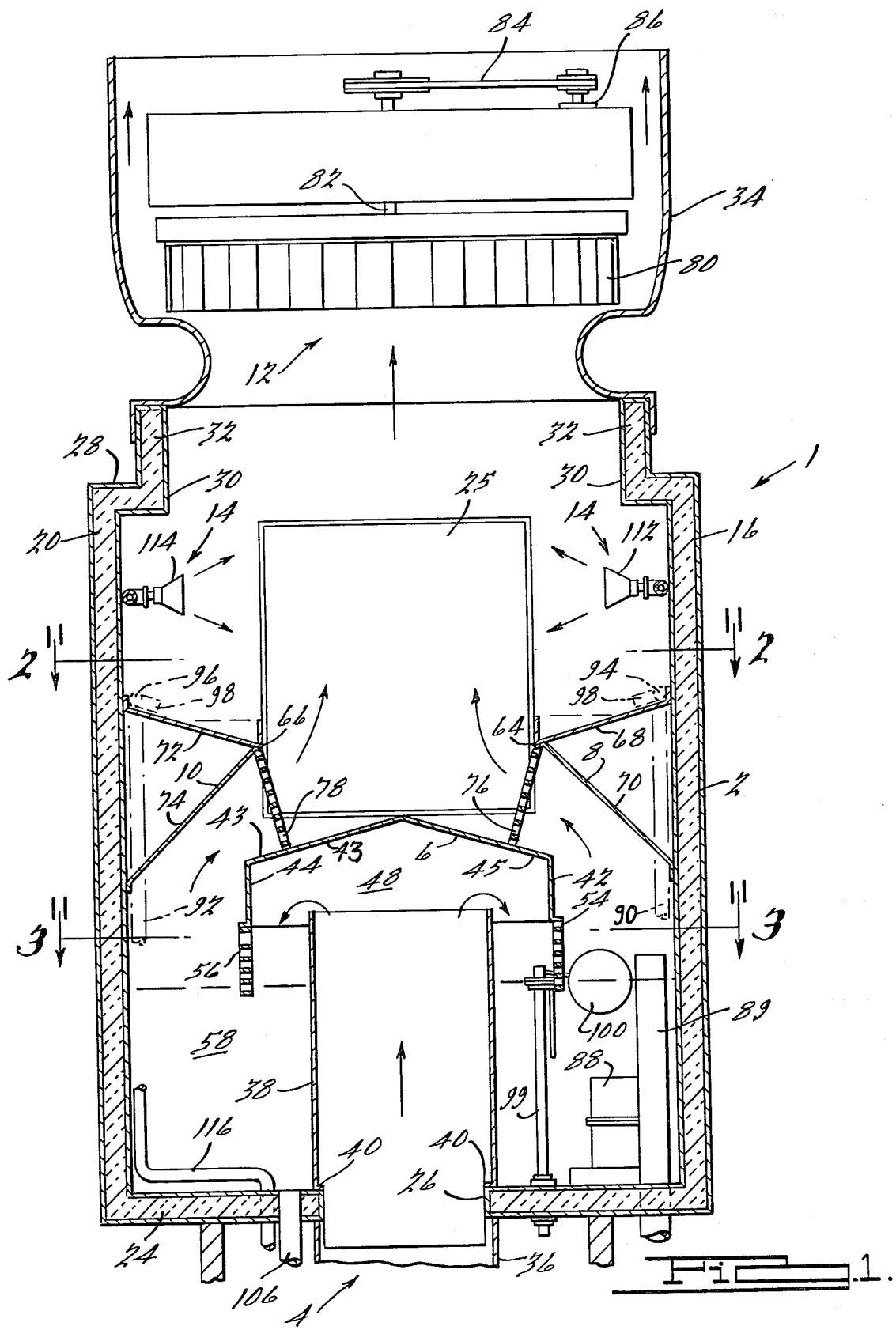
FIG. 1 is a longitudinal sectional view, broken away, of a preferred embodiment of the present invention.

Now referring to the Figures, an air cleaner of the present invention is shown and indicated generally by the numeral 1. Air cleaner 1 broadly comprises a housing 2 having the general shape of a rectangular parallelepiped, air inlet means 4, lower baffle means 6, upper baffle means 8 and 10, and air exhaust means 12. In addition, water cleaning means 14 is provided to clean the internal surfaces of air cleaner 1.

Housing 2 provides an enclosure for the apparatus of the present invention and serves to confine the volume of air being filtered within the apparatus as well as supporting the various internal parts and exhaust means 12 thereof. Housing 2 has a generally rectangular parallelepiped configuration with rectangular side walls 16, 18, 20, and 22, bottom wall 24 having rectangular air inlet opening 26 therein, and top wall 28 having circular air outlet or exhaust opening 30 therein. Top wall 28 has a cylindrically-shaped portion 32 which supports housing 34, while side wall 22 has a rectangular portion 25 which can be removed to allow access to the interior of housing 2 for maintenance and the like. The walls of housing 2 can be of insulating construction to minimize noise and to help maintain the interior of housing 2 at an operable temperature in hot or cold climates. Of course, in cold climates an interior or emersion heater may also be used.

Disposed in alignment with air inlet opening 26 is inlet duct 36 which can be of rectangular cross section and is adapted to communicate the air which is desired to clean with air inlet opening 26, and, hence, the interior of housing 2. Thus, duct 36 can be connected to the exhaust duct from a hood of a cooking stove or the like. Extending upwardly into housing 2 and aligned with inlet opening 26 and in communication therewith is a second inlet duct 38 which is also of rectangular cross section and which has adjacent edge portions 40 sealably engaged to bottom wall 24 around the periphery of inlet opening 26. Disposed above inlet duct 38 and generally in opposition to air upwardly flowing therethrough, the air flow being indicated by the arrows in FIG. 1, is lower baffle 6. Lower baffle 6 is in the form of an elongated cap member having a V-shaped cross section with downwardly extending legs 42 and 44 and having transverse end walls 46 and 48 located in facing abutting relationship to side walls 50 and 52 of inlet duct 36. A pair of grid members 54 and 56 are attached to the lower edge portions of depending flanges 42 and 44 respectively and extend downwardly therefrom to water reservoir 58 bounded by the lower portions of side walls 16, 18, 20 and 22 and bottom wall 24 of housing 2 and side walls 50, 52 and 60, 62 of inlet duct 38. Grid members 54 and 56 are provided to facilitate a homogeneous water curtain transverse to the air flow and can be made of nylon, plastic or any other suitable material. Grid members 54 and 56 are each of a foraminous construction to allow air flow therethrough. The exact shape or number of apertures in each grid 54 and 56 is not critical but each must have a multiplicity of apertures of a size small enough to avoid tearing a sheet of water flowing thereover and of sufficient number to facilitate passing of a high volume of air therethrough. Half inch square holes are suitable.

An upper baffle means comprises a pair of elongated symmetrical upper baffles 8 and 10 extending between side walls 18 and 22 and extending in opposition to upwardly flowing inlet air proximate to side walls 16 and 20 and flowing between said side wall 16 and leg 42 of lower baffle 6 and side wall 20 and leg 44 of lower baffle 6. As best shown in FIG. 1, upper baffles 8 and 10 are of generally V-shaped cross section with inwardly extending apexes 64 and 66 respectively. Thus, baffle 8 has wall 68 extending horizontally inwardly and downwardly from wall 16 of housing 2 and fixedly attached thereto and has a wall 70 extending from a lower portion of said wall 16 horizontally inwardly and upwardly to apex 64. Upper baffle 10 is of analogous construction, having walls 72 and 74 joined at apex 66 and extending inwardly from side wall 20 of housing 2. Extending downwardly from each apex 64 and 66 are respective grids 76 and 78, the bottom edges of which are in abutting relationship to roof portion 43 and 45 respectively of lower baffle 6. Upper grids 76 and 78 serve the same purpose as lower grids 54 and 56 and can be of like construction. However, it has been found desirable to cant each grid 76 and 78 slightly from the vertical, e.g. 10° to 15°, the bottom of each grid being inward of the top as shown in FIG. 1.

As will be appreciated by those skilled in the art, inlet air is pulled through housing 2 and exhausted to atmosphere by exhaust means 12 which comprises exhaust fan 80 having a shaft 82 driven in a conventional manner by drive belt 84 connected to motor 86.

Means for providing a continuous flow of water past lower grids 54 and 56 and upper grids 76 and 78 is provided by a recirculating water system comprising pump 88, such as of the well-known sumppump type, which draws water from reservoir 58 to supply water via connecting conduits 90 and 92 to horizontally disposed pipes 94 and 96. Each pipe 94 and 96 have a plurality of spaced nozzles 98 which distribute water relatively evenly over walls 68 and 72 of upper baffles 8 and 10 respectively. A float control 100 is associated with reservoir 58 to selectively feed make-up solution into reservoir 58 when the water level of reservoir 58 falls below a selected level. A wetting agent feeder 102 and a hypochlorinator feeder 104 are provided to add wetting agent and a hypochlorinating agent to the make-up water input controlled by float control 100. An overflow pipe 89 is employed to drain water from reservoir 58 if the water exceeds a certain water level. To selectively remove all water from reservoir 58 a drain pipe 106 is provided in communication with reservoir 58 which, upon turning valve 109 to a passing condition removes all water in reservoir 58 via waste sink 108 and grease trap 110 which are of conventional design.

To provide water cleaning means 14 for selectively periodically scrubbing the interior surfaces of the apparatus of this invention, a separate water input system is employed. Thus, a pair of spray nozzles 112 and 114 are located within housing 2 above baffles 8 and 10 respectively. Each nozzle 112 and 114 is connected to a high pressure source of water via conduit 116 to provide, on a selected basis, cleaning of the interior surfaces of air cleaner 1. An automatic detergent feeder 118 is connected to conduit 116 to feed a detergent solution into water passing through conduit 116 to provide an effective cleaning solution through nozzles 112 and 114.

The present invention will be further understood from the following description of the method of operation of air cleaner 1. It is intended that air cleaner 1 will be mounted or otherwise attached in communication with a source of contaminated air such as that provided by the exhaust duct of a kitchen hood. It will, of course, be appreciated that the specific embodiment of the invention disclosed herein is particularly adapted to be mounted on a roof in the manner conventional for exhaust fans or other commercial duty ventilating apparatus and that suitable ducts will be employed to transport the contaminated air to the cleaning apparatus.

In operation of the apparatus of this invention, air is drawn upwardly by exhaust means 12 into housing 2 through inlet duct 38, is sequentially drawn through one of the lower curtains provided by grids 54 and 56 and then through one of the upper water curtains provided by grids 70 and 74 and thence exhausted into the atmosphere by means of an exhaust fan 80. The flow of air is shown by arrows in FIG. 1. Thus, inlet air exits the upper end of inlet duct 38 in an upward direction and is bifurcated and deflected outwardly and downwardly by lower baffle 6 to pass through one or the other of continuous water curtains on grids 54 and 56. Each branch of the bifurcated air is then drawn upwardly and deflected inwardly by one of upper baffles 8 and 10 which direct the respective branch of air through one of the upper water curtains on grids 76 and 78, whereupon the branches of air merge and are exhausted upwardly by fan 80 into the atmosphere.

The upper and lower water curtains are provided in the following manner. Pump 88 pumps water from reservoir 58 through conduits 90 and 92 to horizontally disposed water distribution bars 94 and 96 each of which has a plurality of nozzles 98 thereon to provide an even sheet of water flowing inwardly and downwardly along the entire width of the upper surface of walls 68 and 72. The water flows over apexes 64 and 66 and downwardly along grids 76 and 78 respectively to form the upper water curtains associated with said grids. Upon reaching lower baffle 6, the water flows downwardly and is directed outwardly by the cant of roof portions 43 and 45 of lower baffle 6 and along downwardly extending flanges 42 and 44 to lower grids 54 and 56 to form the lower water curtains associated therewith and to return to water reservoir 58. The grids of the apparatus must be properly leveled to insure that a homogeneous curtain of water is provided on each grid. One method of leveling the grids is to level the entire apparatus. Another method is to mount the upper and lower baffles in a manner that each can be individually adjusted and leveled by movement thereof relative to housing 2. Each transverse and tear-free water curtain washes the air flowing therethrough to cool and remove grease or other particles or vapors which are transported by the water into reservoir 58. It will be noted that the water curtains and inlet air are contacted in inverse relationship, i.e. the air is initially passed through a lower curtain of water which has already been used to remove contaminants from air which had passed through the lower curtain of water. Thus, the cleaner water is used to scrub the cleaner air to thereby maximize the cleansing effect. It will also be noted that the pump 88 draws relatively clean water from the bottom of reservoir 58, grease and other contaminants being generally lighter than water and located on the top portion of reservoir 58.

After apparatus 1 has been in operation for a period of time sufficient that reservoir 58 and/or the interior surfaces of housing 2 contain substantial grease or other contaminants, the following procedure is followed. It will, of course, be appreciated by those skilled in the art that the following procedure can be automatically sequenced by suitable commercially available controls and such is contemplated for use with the present invention. Thus, periodically, the operation of exhaust means 12 or more specifically motor 86 connected to exhaust fan 80 will be discontinued to stop the upward movement of air through housing 2. To drain all water, including contaminants therein or floating thereon from reservoir 58, valve 109 of drain pipe 106 is changed to a passing, or open, condition while at the same time, valve 113 in the cold water feed line is changed to a non-passing or closed condition. After about five minutes, and with drain valve 109 open, a scrub cycle is begun by opening valve 121 in a hot water feed line and simultaneously opening detergent valve 119 to pass detergent from a conventional detergent feed 118. After 3 or 4 minutes, detergent valve 119 is closed and a rinse cycle begins and continues for another 3 or 4 minutes. This completes the scrub cycle and then in sequence, valve 120 closes to shut off the hot water supply, drain valve 109 closed, and cold water valve 113 opens to fill reservoir 58 via conduit 99. Simultaneous with valve 113, valves 101 and 103 open to respectively feed an odor and bacteria control agent such as a hypochlorinating agent from supply 102 and wetting agent from supply 104. Upon reaching a full level, float control 100 shuts off water flow into reservoir 58. Finally, pump 88 and exhaust means 12 are engaged.

Of course, it will be appreciated that while the feeding of detergent, hypochlorinating agent and wetting agent is shown diagramatically through valves, suitable pumping mechanisms such as can be switchably engaged and disengaged are contemplated for use with the present invention. Of course, suitable check valves, indicated as ck in the drawings, or other back flow preventing devices such as back flow prevention 111 can be used to comply with commercial plumbing practices and building codes.

In addition, manual switching means can be provided to override the automatic controls to begin or end cycles on a manually selected basis. Also, manual or automatic means can be provided to shut off exhaust fan means 12 and engage hot water flow through conduit 116 to provide water spray through nozzles 112 and 114 for fire control. Once having benefit of the foregoing disclosure, these and other modifications of the present invention will be apparent to those skilled in the art. Such modifications, variations, and changes are contemplated to be within the scope of the present invention which is intended to be limited only by the scope of the claims appended hereto.

What is claimed is:

1. An apparatus for ventilating and cleaning air having smoke, grease and the like as contaminants therein, comprising:
    a housing having side walls, an air inlet opening and an air exhaust opening;
    an air inlet duct communicating with said air inlet opening and having an end portion extending a substantial distance into said housing;
    means for moving air through said housing;
    first and second lower grids positioned in the interior of said housing;
    a lower baffle for directing air through said lower grids having a generally inverted V-shaped cross-section with downwardly extending side flanges, said lower baffle being located in opposition to said end portion of said inlet duct and each of said side flanges being spaced from said inlet duct and supporting one of said first and second lower grids;
    first and second upper grids supported in the interior of said housing at a location generally higher than said first and second lower grids;
    first and second upper baffles for respectively directing air through said first and second upper grids, each of said first and second upper baffles having a V-shaped cross-section and being attached to opposite side walls of said housing, the apex of each said first and second upper baffles being inwardly directed and supporting one of said first and second upper grids respectively;
    means for providing a homogeneous sheet of water on each of said first and second upper grids and said first and second lower grids; and
    each of said first and second upper grids and said first and second lower grids comprising a foraminous sheet member located generally transverse to the flow of air directed therethrough and having means associated with each perimeter edge portion thereof for preventing flow of air around said sheet member.

2. An apparatus as in claim 1 wherein said lower baffle has a pair of transverse end walls, each of said pair being attached to said inlet duct.

3. An apparatus as in claim 1 wherein said inlet duct is sealably engaged around the perimeter of said air inlet opening, said air inlet opening being in a bottom wall of said housing, and wherein said housing side walls extend upwardly from said bottom wall to define a water reservoir between said side walls, said bottom wall, and said inlet duct, and further wherein said means for providing a homogeneous sheet of water includes pump means operatively connected to said reservoir and to a pair of horizontally disposed conduits each one overlying and associated with one of said upper baffles, each horizontally disposed conduit having a plurality of apertures therein for substantially evenly distributing water over the associated upper baffle.

4. An apparatus as in claim 3 including a water scrub system comprising a plurality of spray nozzles located in the upper portion of the interior of said housing each of said nozzles being communicated with a source of hot water, means for selectively flowing water through each of said nozzles, and drain means for selectively removing said water from said reservoir.

5. A method of removing contaminates and other foreign matter from air by passing said air through a housing and cleaning said housing, said method comprising the steps of cyclically:
    (A) providing a sheet of water interior of said housing, said sheet of water being drawn from a reservoir located in the bottom portion of said housing, and said sheet of water flowing downwardly to sequentially form a first water curtain and a second water curtain spaced therefrom, said second water curtain flowing into said reservoir; and passing air sequentially through said second water curtain and said first water curtain;
    (B) discontinuing step (A), draining water from said reservoir and cleaning the interior surfaces within said housing by spraying hot water thereagainst, said hot water flowing downwardly into said reservoir and being continuously drained therefrom; and (C) discontinuing step (B) and filling said reservoir with water.

6. The method of claim 5 wherein said first and second homogeneous water curtains comprise water having a wetting agent therein.

7. The method of claim 6 wherein step (B) is carried out by sequentially spraying hot water with and without detergent.

8. The method of claim 7 wherein said water in said reservoir contains an odor and bacteria control agent.

9. The method of claim 8 wherein said steps (A), (B) and (C) are automatically carried out on a periodic, timed basis by automatic control means.

10. The method of claim 9 wherein each of said first and second water curtains are provided by flowing water over a grid positioned within said housing.

* * * * *